(No Model.)

E. KOHLER.
MEASURING SCOOP.

No. 304,939.  Patented Sept. 9, 1884.

WITNESSES
Edwin L. Yewell.
J. J. McCarthy.

INVENTOR
Elias Kohler
By C. M. Alexander
Attorney

UNITED STATES PATENT OFFICE.

ELIAS KOHLER, OF YORK, PENNSYLVANIA.

MEASURING-SCOOP.

SPECIFICATION forming part of Letters Patent No. 304,939, dated September 9, 1884.

Application filed May 21, 1884. (No model.)

*To all whom it may concern:*

Be it known that I, ELIAS KOHLER, a citizen of the United States, residing at York, in the county of York and State of Pennsylvania, have invented certain new and useful Improvements in Measuring-Scoops, of which the following is a specification, reference being had therein to the accompanying drawings.

My invention relates to improvements in measuring-scoops, and is designed to produce a device that will obviate the necessity of using the hands in filling the measure, and also the use of an extra or additional scoop or shovel in filling the measure. Further, it is designed to take up the grain or other material from the floor, or the side or a corner of a granary or other receptacle. The device is also designed to easily penetrate the material, and also deliver it into a compact body into a bag or other receiver. It also "strokes" the grain.

To describe the device producing the above results or objects, reference will be had to the annexed drawings, in which—

Figure 1:
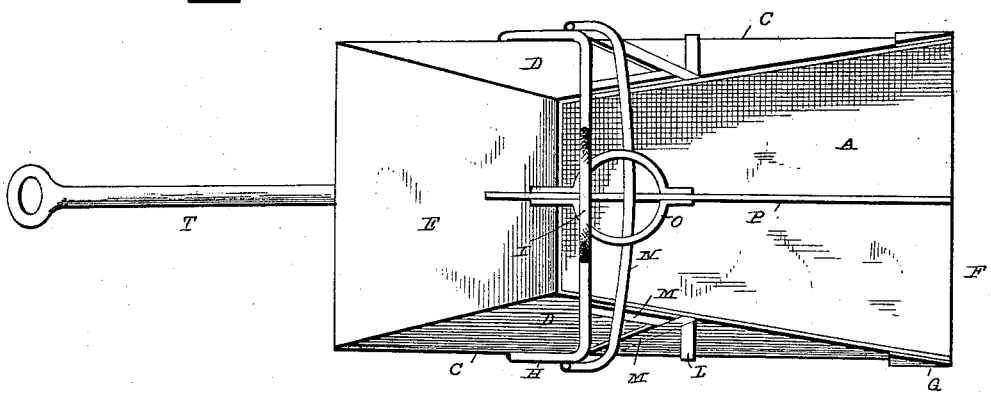
Figure 2:
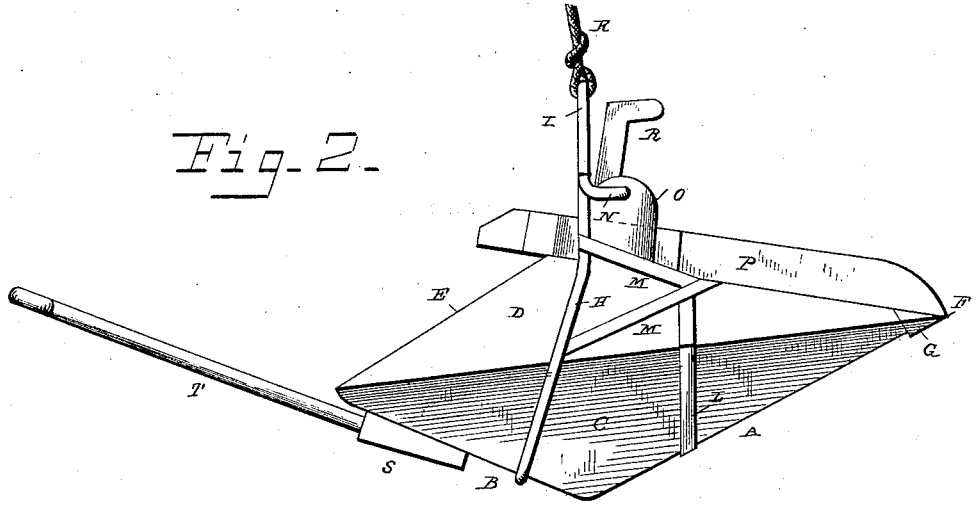

Figure 1 represents a plan view of the device, and Fig. 2 a side elevation of the same.

The scoop proper is formed of a bottom, A, and back B set at an angle—one to the other—the part A being somewhat the longer. The sides are formed vertical to the bottom and back to a line connecting the outer ends of each, which vertical portion is shown at C. From this line the sides project inward, as shown at D, which is in shape an obtuse triangle. Projecting forward from the end of the back B to the angle of the sides D is the top E, which is trapezoidal in form, as is shown. The body of the scoop thus completed has an open front, and is constructed to hold a definite quantity of grain or other material. The front of the scoop at F is made thin or sharp, to enable it to easily penetrate the grain, and is strengthened by an additional piece or band, G.

To the vertical sides C is attached a bail, H, which is continued over the scoop, forming a handle or support, I, which in small measures will be held in the hand, but in large ones will have attached to it a rope or other suspensory device, K.

Around the scoop, and under the part A, is a band, L, for strengthening the device, and the bail H is secured in position by the braces M.

Projecting forward and parallel with the bail H, and attached to it at proper points, is a guide, N, having adapted to slide on it a preferably divided cylindrical carriage, O, having centrally passed through and secured to it a stroker, P, projecting in a longitudinal direction across the open front of the scoop. The stroker is operated by a handle, R, attached to it. Under the back B is a socket, S, adapted to receive an operating-handle, T, as shown.

It is evident from the above description of the parts that the device is perfectly adapted to scoop, stroke, and measure grain or other dry material, whatever the position of the same may be, whether on a floor, against the sides of a building, or in a corner, and also to deliver it accurately into any receptacle which will receive the mouth of the said scoop.

The right to vary the construction consistent with the spirit of the invention is reserved.

What I claim as of my invention is—

1. A measuring-scoop and stroker combined, substantially as and for the purpose specified.

2. A measuring-scoop constructed to hold a definite quantity by measure, and having means for suspending it and a handle for operating it, substantially as and for the purpose specified.

3. The scoop consisting of a flat bottom and back placed at an angle one to the other, and connected by vertical sides, and a top consisting of inwardly-projecting sides and a slanting rear covering, substantially as and for the purpose specified.

4. A scoop having a flat bottom with a straight thinned or sharpened front, and a strengthening and protecting band for the same for allowing it to be operated to clean grain from a floor or in corners, substantially as and for the purpose specified.

5. A scoop having passed around and under it a bail continued over the said scoop and there adapted to receive suspensory devices, the said bail being secured in place by braces fastened to the sides of the scoop, substantially as set forth.

6. In combination with a scoop, a stroker resting on and over the open end of the said scoop, and operated and guided thereon, substantially as and for the purpose specified.

7. In combination with a scoop, a stroker consisting of a piece projecting over the open end of the scoop, a cylindrical or other shaped carriage secured to the same and traveling on a guide of proper construction, and a handle for operating the stroker, substantially as and for the purpose specified.

8. In combination with a scoop having an upwardly-projecting bail surrounding it, a guide parallel with and secured to the bail, and a stroker supported and guided by a carriage traveling on the said guide, substantially as and for the purpose specified.

9. The combination of a measuring-scoop consisting of a bottom and back set at an angle one to the other, vertical and inwardly-projecting sides, a top covering the rear of the scoop, the front being sharpened and protected, and the scoop properly braced with a bail surrounding and adapted to support the scoop by suspension, the stroker secured to a carriage traveling on a guide on the bail and operated by a handle, and the socket and handle adapted to enter therein and operate the said scoop, all arranged to operate substantially as and for the purpose specified.

In testimony whereof I affix my signature in presence of two witnesses.

ELIAS KOHLER.

Witnesses:
FRANK. EMIL,
E. C. PEELING.